(12) United States Patent
Perry (10) Patent No.: US 7,402,062 B2
(45) Date of Patent: *Jul. 22, 2008

(54) SYSTEM FOR REPLACING A BATTERY PACK

(75) Inventor: Lou Perry, Acton, MA (US)

(73) Assignee: American Power Conversion Corporation, West Kingston, RI (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/157,386

(22) Filed: Jun. 20, 2005

(65) Prior Publication Data

US 2005/0227519 A1 Oct. 13, 2005

Related U.S. Application Data

(63) Continuation of application No. 10/654,735, filed on Sep. 4, 2003, now Pat. No. 6,923,676.

(51) Int. Cl.
*H01R 13/62* (2006.01)
(52) U.S. Cl. ..................................................... 439/248
(58) Field of Classification Search ................. 439/500, 439/247, 248; 429/160, 957
See application file for complete search history.

(56) References Cited

U.S. PATENT DOCUMENTS

| | | | | |
|---|---|---|---|---|
| 3,094,364 A * | 6/1963 | Liagg | ......................... | 439/247 |
| 4,346,151 A * | 8/1982 | Uba et al. | ..................... | 429/54 |
| 4,815,984 A * | 3/1989 | Sugiyama et al. | ........... | 439/211 |
| 4,988,308 A * | 1/1991 | Toedtman | ................... | 439/248 |
| 5,227,262 A | 7/1993 | Ozer | | |
| 5,437,939 A * | 8/1995 | Beckley | ........................ | 429/99 |
| 5,514,000 A * | 5/1996 | Krause et al. | ................ | 439/248 |
| 5,516,303 A | 5/1996 | Yohn et al. | | |
| 5,522,734 A * | 6/1996 | Goertzen | ..................... | 439/500 |
| 5,538,435 A * | 7/1996 | Yohn | ........................... | 439/188 |
| 5,606,150 A * | 2/1997 | Radliff et al. | .................. | 174/92 |
| 5,619,076 A | 4/1997 | Layden et al. | | |
| 5,633,572 A | 5/1997 | Steele et al. | | |
| 5,928,020 A * | 7/1999 | Bishop et al. | ................ | 439/188 |
| 6,524,743 B2 * | 2/2003 | Vackar | ........................ | 429/159 |
| 6,656,631 B2 * | 12/2003 | Zayatz et al. | ................ | 429/163 |
| 6,773,285 B2 | 8/2004 | Bernat et al. | | |
| 6,923,676 B2 | 8/2005 | Perry | | |

FOREIGN PATENT DOCUMENTS

EP 0 677 413 B1 10/1995
FR 2 828 589 A1 2/2003

* cited by examiner

*Primary Examiner*—Neil Abrams
(74) *Attorney, Agent, or Firm*—Lowrie, Lando & Anastasi, LLP (57) ABSTRACT

A battery connector system includes a connector receptacle having a housing, the connector receptacle positioned on a battery pack having a positive battery lead and a negative battery lead, a first wire and a second wire coupled to the connector receptacle, the first wire and the second wire extending from the housing to connect the connector receptacle with the positive battery lead and the negative battery lead, and a connector plug positioned in an electronic device. The connector receptacle includes integral alignment features for mating with the connector plug upon insertion of the battery pack into the electronic device and may be attached to the battery pack by an adhesive bond. The connector plug is float connected to the electronic device.

8 Claims, 7 Drawing Sheets

SYSTEM FOR REPLACING A BATTERY PACK

RELATED APPLICATIONS

This application is a continuation of U.S. Ser. No. 10/654,735, filed on Sep. 4, 2003, now U.S. Pat. No. 6,923,676, which is incorporated herein by reference.

FIELD OF THE INVENTION

Embodiments of the present invention are related to battery packs, and more particularly to the efficient exchange of a battery pack in a system, such as the exchange of a battery pack in an uninterruptible power supply system.

BACKGROUND OF THE INVENTION

Batteries are frequently used in electronic systems as either a primary source of power, or as a backup source of power, such as in an uninterruptible power supply system. Although a single battery can be employed to power some systems, it is not uncommon for an electronic device to require a battery pack containing as few as two batteries or as many as twelve batteries. Generally, batteries contained in a battery pack are lead acid batteries bonded together. The battery pack is manually connected to the electronic system by an assembler, who may have to remove from the connector the leads of the used battery, and thereafter attach to the connector the leads of the new battery. To avoid injury to the user and damage to the system from a faulty battery or from potentially live battery leads, great care must be taken in connecting or replacing a battery in an electronic device, since battery leads often require manual release and reconnection. This often requires that the system be powered down for a substantial amount of time so that the battery leads are appropriately connected. In an uninterruptible power supply, substantial downtime is undesirable.

Connector systems that do not require manual intervention to replace the battery are known. Components for battery connector systems are available for connecting battery packs to electronic devices. These systems are often useful in high-end battery packs containing between four and twelve batteries, as the connector systems are expensive.

SUMMARY OF THE INVENTION

The present invention relates to an improved system for providing a connection between a battery and the load to which it supplies power. Embodiments of the invention provide a cost-effective apparatus for efficiently and safely replacing a battery pack, generally consisting of two batteries, in an electronic device.

Embodiments of the invention include a battery connector system for use in connecting a battery in an uninterruptible power supply. The battery connector system includes a connector receptacle having a housing, the connector receptacle positioned on a battery pack having a positive battery lead and a negative battery lead, a first wire and a second wire coupled to the connector receptacle, the first wire and the second wire extending from the housing to connect the connector receptacle with the positive battery lead and the negative battery lead, and a connector plug positioned in an electronic device. The connector receptacle includes alignment surfaces for mating with the connector plug upon insertion of the battery pack into the uninterruptible power supply and alignment surfaces to align with the alignment surfaces of the connector receptacle.

Implementations of the invention can include one or more of the following features. The battery pack is comprised of a first battery and a second battery, and each of the first battery and the second battery include a positive battery lead and a negative battery lead. The first wire connects to the positive lead of the first battery and the second wire connects to the negative battery lead of the second battery. The integral alignment features can include a substantially bell-shaped housing embodying the connector receptacle, the bell-shaped housing having lead-in angles on a proximal end of the housing.

Implementations of the invention can further include one or more of the following features. The connector plug can include curved walls forming a small perimeter on a proximal end and a large perimeter on a distal end relative to the connector receptacle. The connector receptacle can be positioned on the battery pack with an adhesive bonding joint. The connector receptacle housing can include a rib positioned on a bottom face of the housing to slide into a position in a groove formed on the battery pack. The connector receptacle housing can further include a tab positioned on an end of the housing to align the housing on an edge of the battery pack.

Implementations of the invention can further include one or more of the following features. The connector plug may be retained in the electronic device with a snap inserted into an aperture formed in the electronic device. The snap can include a knob to insert into an aperture, and the dimensions of the knob can be substantially smaller than the dimensions of the aperture. The connector plug can be float connected to the electronic device.

Other embodiments of the invention include a dual battery pack providing automatic connection to an electronic device having a connector plug. The dual battery pack includes a first battery having a first positive terminal and a first negative terminal, a second battery having a second positive terminal and a second negative terminal, a groove formed between the first battery and the second battery, and a battery connector system. The battery connector system includes a connector receptacle having a housing, a rib, positioned on a bottom surface of the housing for insertion into the groove, a first wire extending from the connector receptacle to connect with the first positive terminal, a second wire extending from the connector receptacle to connect with the second negative terminal, and lead-in angles on an end of the housing for self alignment with the connector plug.

Implementations of the invention can include one or more of the following features. The connector plug can include curved walls forming a small perimeter on a proximal end and a large perimeter on a distal end relative to the connector receptacle. The connector receptacle may be positioned on the battery pack with an adhesive bonding joint. The connector receptacle housing can include an edge stop positioned in a bottom end surface of the housing for alignment with an edge of the battery pack.

Implementations of the invention can further include one or more of the following features. The connector plug can be float connected to the electronic device. The connector plug can further comprise at least one snap to connect to an aperture of the electronic device. The at least one snap can be substantially smaller than the aperture, and the at least one snap can freely move while in the aperture.

Embodiments of the invention further comprise a method of coupling an electrical device to an internal power source. The method includes attaching a connector receptacle to a battery pack including connecting the receptacle to leads of the battery pack, mounting a connector plug in the electronic device to facilitate automatic coupling with the receptacle, aligning the receptacle with the connector plug and inserting the battery pack into the electronic device, and mating the receptacle and the connector plug in the electronic device.

Implementations of the invention can include one or more of the following features. The method can include assembling the battery pack, and assembling the battery pack can include aligning the receptacle on the battery pack using a tongue-and-groove configuration. The method can further include aligning the receptacle on the battery pack using a tab positioned to contact a front edge of the battery pack and float mounting can include snapping the connector plug onto a portion of the electronic device such that the connector plug is movably connected on the electronic device.

The invention will be more fully understood after a review of the following figures, detailed description and claims.

BRIEF DESCRIPTION OF THE FIGURES

For a better understanding of the present invention, reference is made to the figures which are incorporated herein by reference and in which.

DETAILED DESCRIPTION OF THE INVENTION

Embodiments of the invention provide a battery pack exchanging system whereby the battery pack is replaceable by a blind mating connection in an electronic device. The battery pack replacement is accomplished by mating a receptacle positioned on a battery pack with a connector plug positioned in a battery compartment of the electronic device. Embodiments of the invention are preferably used in electronic devices requiring a battery pack having two batteries, but can be used with a battery pack having more than two batteries or with a single battery. Embodiments of the invention can be used in uninterruptible power supplies, computer systems, and in telecommunications applications. Embodiments of the present invention can also be used with systems other than computer systems and in systems other than uninterruptible power supplies.

Figure 1:
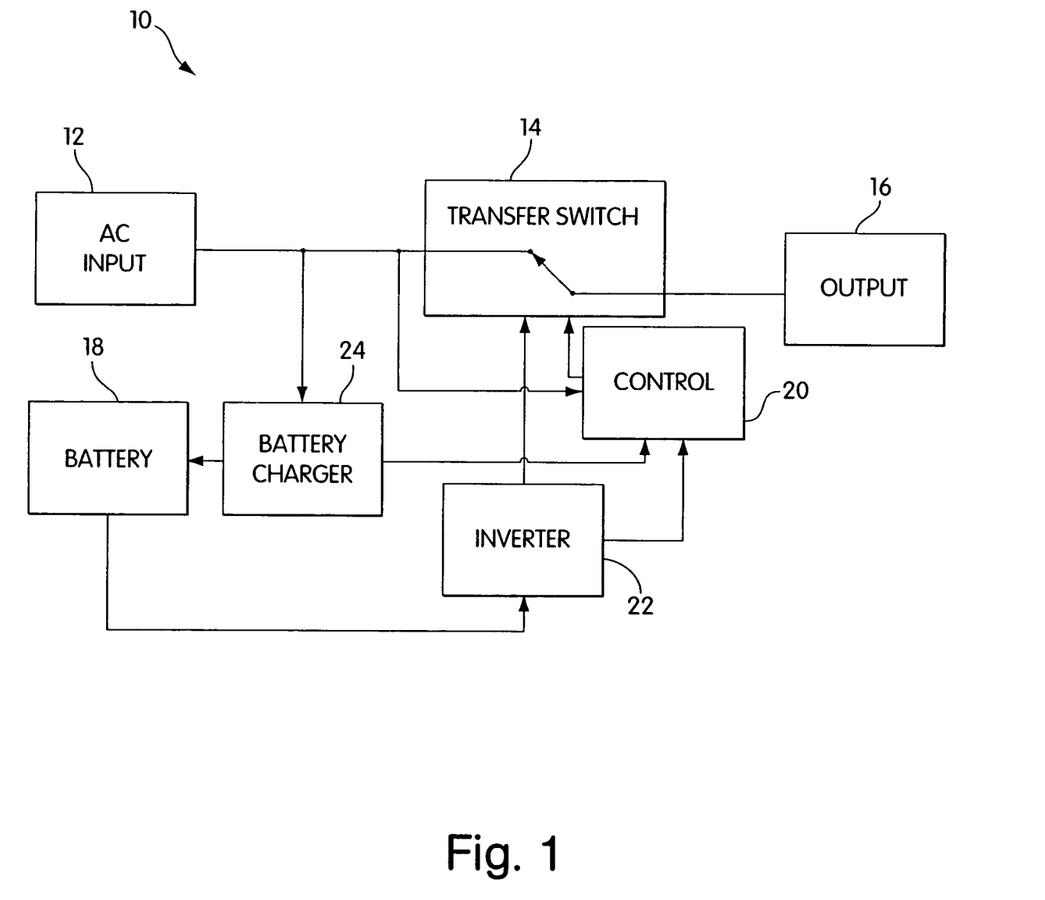
FIG. 1 is a block diagram of an uninterruptible power supply.

Batteries are used in a number of electronic devices to provide primary power or backup power to the system. For example, batteries are used in uninterruptible power supplies (UPS) to provide backup power for electronic systems. Often, particularly in larger systems, the battery is a battery pack comprised of two or more than two batteries bonded together. Backup battery power prevents loss of data that can occur during a blackout, a brownout (low voltage), or a spike or a surge of electricity through the system. Referring to FIG. 1, an example of a typical uninterruptible power supply 10 that uses a battery pack for backup power includes an input power source 12, a transfer switch 14, an output 16, a battery 18, a controller 20, and an inverter 22. The UPS 10 can include a battery charger 24, but need not. The input couples to an AC power source and the output 16 couples to a load. The input 12 provides power to the transfer switch 14 and the battery charger 24. The transfer switch receives AC power from the input and from the inverter 22. The inverter receives DC power from the battery and converts the DC power to AC power and provides AC power to the transfer switch. The controller 20 determines whether power is provided from the AC input or from the inverter, depending on allowable tolerances of the system. Depending on the capacity of the battery and the power requirements of the load, the UPS 10 can provide power to the load during brief power source "dropouts" or for extended power outages. The UPS 10 described herein is provided as an example of a typical off-line system, although other UPS systems can be used with embodiments of the invention.

It is occasionally necessary to replace the battery or the battery pack in the uninterruptible power supply described above, or in other electronic devices. Battery pack replacement is achieved by mating the terminals of the batteries in the pack with the battery connector plugs, which are generally disposed on a surface or in the body of the electronic device. As discussed, batteries are used for backup power in uninterruptible power supplies. Particularly in UPS systems, it is desirable to replace a battery pack quickly so that the system need not be offline for an extended period of time. It is further desirable to efficiently replace the battery pack so that complicated or potentially dangerous manual intervention is avoided.

For ease of illustration, the apparatus of the present invention will be described as it is applied in an uninterruptible power supply. The invention can, however, be employed in any of a number of electronic devices requiring battery power or backup battery power.

Figure 2:
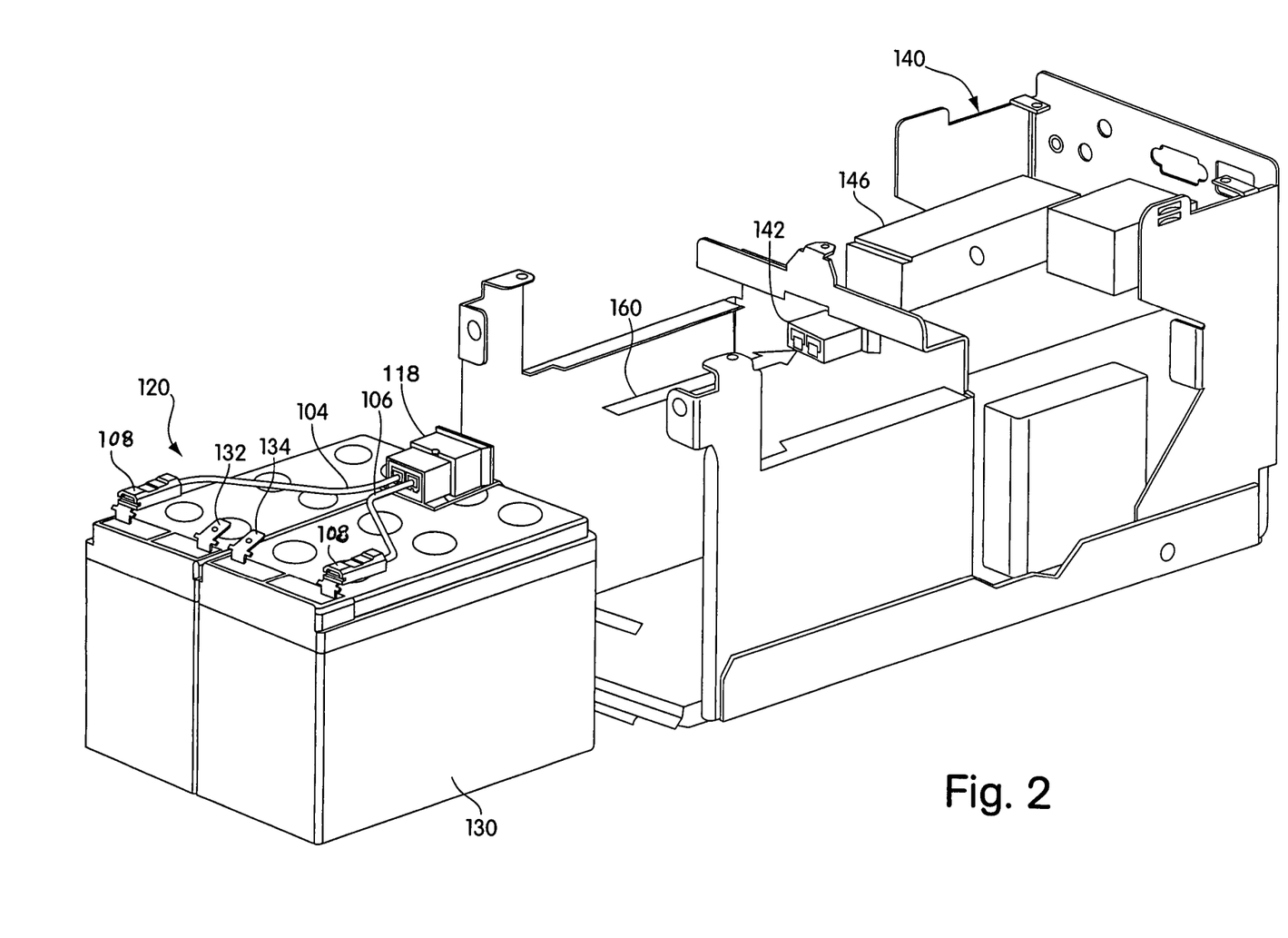
FIG. 2 is a perspective view of a battery and a chassis for the battery in one embodiment of the present invention.

A system for replacing a battery pack in an uninterruptible power supply (UPS) is depicted in FIG. 2. Referring to FIG. 2, an uninterruptible power supply 100 having a backup battery pack is shown prior to insertion of the battery pack 130. The battery pack 130 is comprised of two batteries bonded together. The battery pack 130 includes positive and negative battery terminals 132 and 134, and a blind mate connector system 120. The blind mate connector system includes a blind mate connector receptacle housing 118, a wire 104, a second wire 106, and battery terminal plugs 108. The UPS 140 includes a device chassis 146 and a blind mate connector plug 142. The UPS generally includes a number of other components, which are excluded in FIG. 2 to more clearly depict the battery replacement hardware.

Figure 3A:
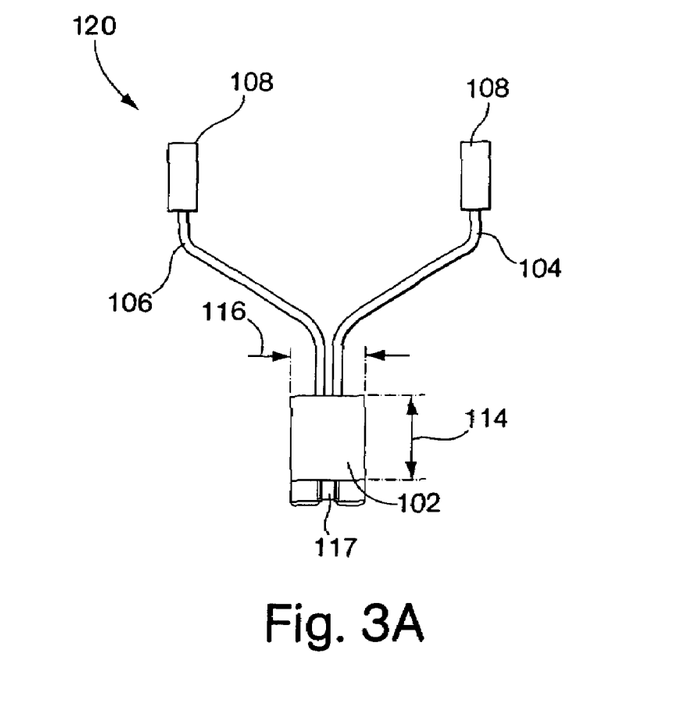
FIG. 3A is a bottom view of a blind mate battery connector in one embodiment of the invention.
Figure 3B:
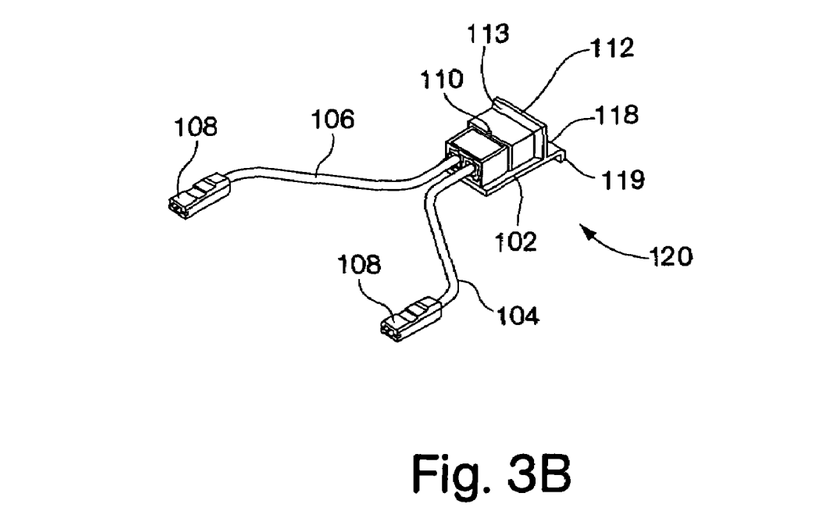
FIG. 3B is a perspective view of the blind mate battery connector of FIG. 3A in one embodiment of the invention.

With continued reference to FIG. 2 and with reference to FIG. 3A and FIG. 3B, and with like numbers referring to like embodiments, the blind mate connector system of the present invention is shown. The blind mate connector system 120 attaches to the battery pack 130, and is generally positioned on a top side of the battery pack 130. The blind mate connector system 120 includes a connector receptacle housing 118, an adhesive bond joint 102, wires 104 and 106, plugs 108, a tab or ribs 117, and edge stop 119. The connector receptacle is positioned within the housing and is not shown in FIGS. 3A and 3B. The connector receptacle housing 118 is attached to the top edge surface of the battery pack 130 with the adhesive bond joint 102. Wires 104 and 106 extend from a rear face of the blind mate connector housing 118. Battery terminal plugs 108 are coupled to the distal end of the wires 104 and 106, each wire having an individual terminal plug 108 attached. The battery terminal plugs 108 connect to the battery terminals 132 and 134 of the battery pack.

The blind mate connector receptacle housing 118 has a housing width 116 and a housing length 114. For example, preferably, the width 116 of the housing can be approximately 1 inch, while the length 114 of the housing can be approximately 1.2 inches. The width 116 can vary along the length 114 of the housing. For example, the widest point of the housing is preferably the front face and the width can taper off to the opposite, or back end of the housing, where wires 104 and 106 are inserted. The widest portion of the housing can be comprised of lead-in angles 113. The lead-in angles 113 are optimized to align the housing during mating. The housing can be constructed of plastic, although other materials are possible. The blind mate connector receptacle housing 118 can be attached to the surface of the battery pack by the adhesive bond joint 102. The adhesive bond joint 102 can be substantially the dimensions of the lower surface of the housing 118 to ensure substantial adhesion. Attachment can be accomplished by any of a number of known means of attachment, such as double-sided tape or epoxy. The edge stop 119 on the lower surface of the housing assist in alignment of the housing 118 on the surface of the battery in the x-axis direction. The ribs 117 assists in alignment of the housing 118 on the edge of the battery pack 130 in the y-axis direction.

Wires 104 and 106 extend from the back side of the housing 118 to connect the receptacle housing 118 with the battery terminals 132 and 134 of the battery pack 130. Wire 104 can connect to a negative battery terminal, while wire 106 can connect to a positive battery terminal. Wire 104 can be black in color to represent connection to the negative terminal, while wire 106 can be red in color to represent connection to the positive terminal of the battery. Other colors can be used to differentiate the positive terminal from the negative terminal.

Figure 4:
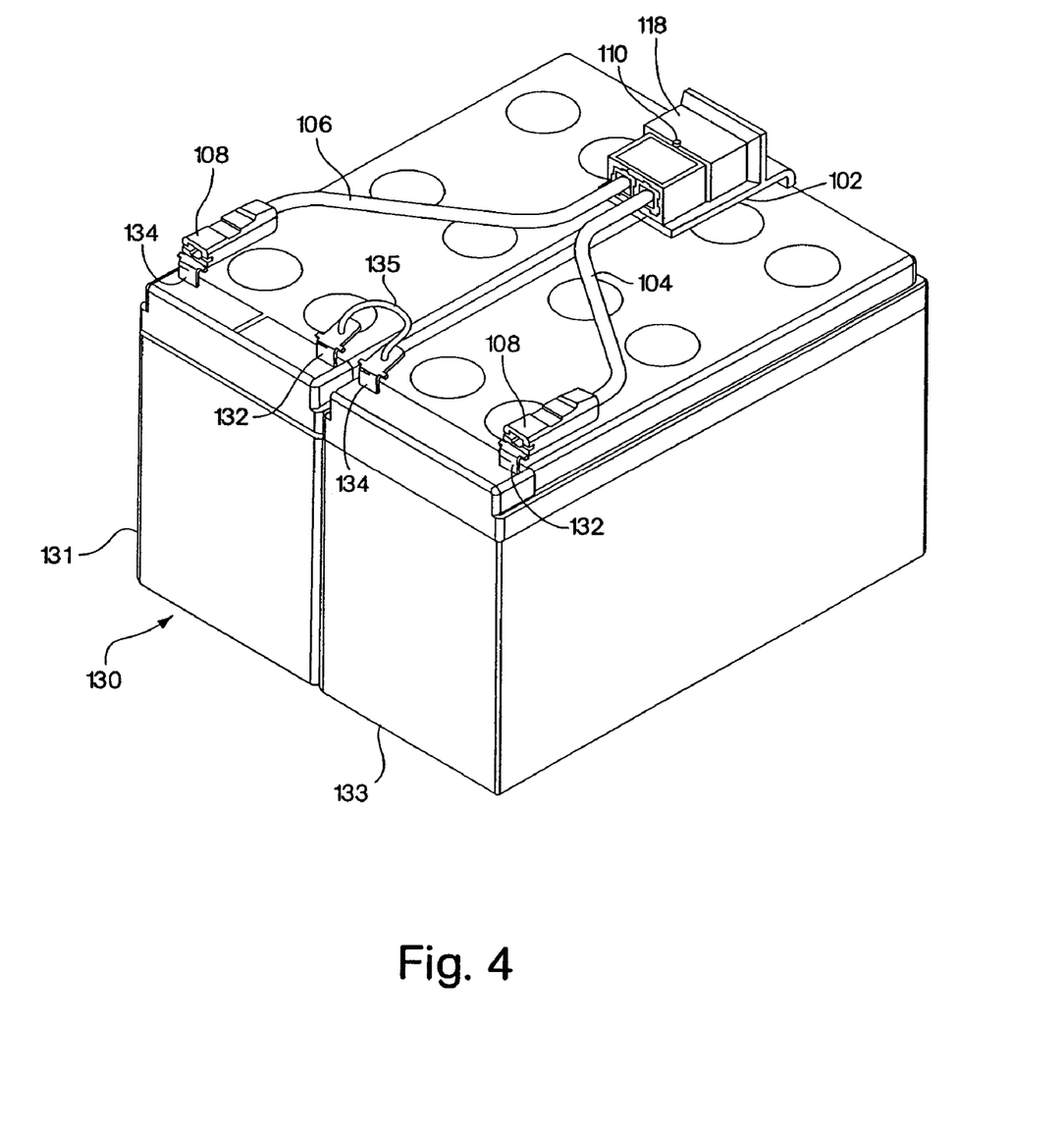
FIG. 4 is a perspective view of a battery pack having the blind mate battery connector attached in one embodiment of the present invention.

The blind mate connector system 120 is depicted as attached to the battery pack in FIG. 4. Referring to FIG. 4, the battery pack 130 is comprised of two individual batteries 131 and 133. Each of the batteries 131 and 133 has a positive battery terminal 134 and a negative battery terminal 132. The positive battery terminals 134 and the negative battery terminals 132 are positioned on one end of the respective battery 131 and 133, and protrude out of the top of the individual cases of the batteries 131 and 133. For example, the terminals 132 and 134 can protrude from the top surface of the battery as a curved, or j-shaped attachment, but may protrude from the battery in a number of shapes and sizes. The battery terminals 132 and 134 can also be positioned at other locations on the battery casing. The wires 104 and 106 are a length such that the wires extend from the rear of the housing 118 and reach to the battery terminals 132 and 134. The wires can be an array of lengths depending on the size of the battery.

The battery terminal plugs 108 are connected to the distal end of the wires 104 and 106. The battery terminal plugs 108 are constructed to snap into position with the battery terminals 132 and 134 such that a secure connection is created between the battery terminal plugs 108, and a respective battery terminal 132 and 134. One of the battery terminal plugs 108 connects to a positive terminal of battery 131, for example, and the other battery terminal plug 108 connects to a negative terminal of battery 133. Thus, both a positive lead and a negative lead are connected to the receptacle by the coupling of battery 131 and battery 133. Remaining terminals 132 and 134, which remain unconnected to the battery, are jumpered together with jumper 135 to complete an electrical circuit. With the plugs 108 in connection with the battery terminals, the battery pack 130 operates as a single unit, and the blind mate connector acts as the single point of connection between the battery pack and the uninterruptible power supply.

The connector receptacle housing 118 of the blind mate connector 120 embodies a receptacle that mates with a connector plug. The connector receptacle is positioned internally within the housing 118 and can be any of a number of known connector sizes and shapes. The connector receptacle is held in position in the housing 118 by a pin 110. The pin 110 slides into an opening on the top of the housing 118 and aligns with a cavity located on the connector receptacle, thereby pegging the connector receptacle into position. The housing and pin combination serves to permit placement and replacement of the connector, and further permit different connectors to be used in the housing without redesign of the housing.

Figure 4A:
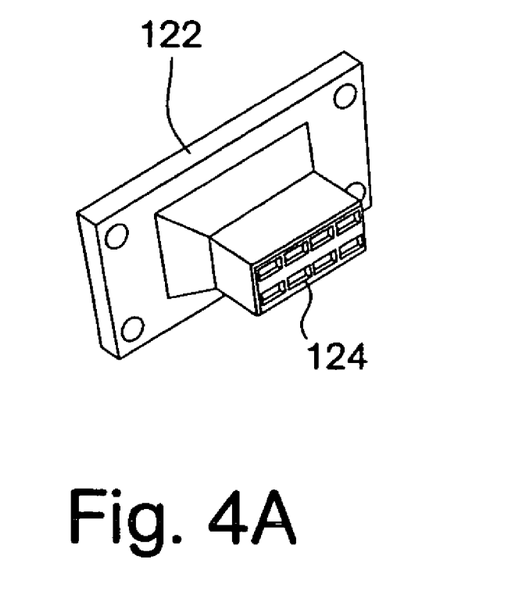
FIG. 4A is a perspective view of an exemplary connector plug used in an embodiment of the invention.
Figure 4B:
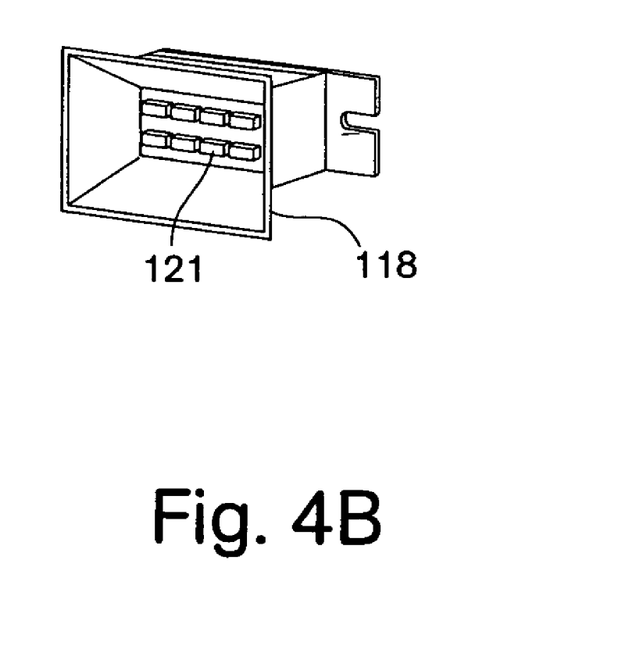
FIG. 4B is a perspective view of an exemplary connector receptacle used in an embodiment of the invention.

A number of connector receptacles and matching connector plugs can be used in the blind mate connector system 120 to comply with the device in which the blind mate connector system is used. Referring to FIGS. 4A and 4B, an exemplary connector receptacle and connector plug is shown. The connector receptacle housing 118 contains a connector receptacle having a plurality of guide plugs 121. A connector plug 122 includes guide plugs 124 that match with the guide plugs 121, such that mating is achieved when the receptor and the connector are pushed together. For example, the guide plugs of the receptacle can include female members, while the guide plugs of the connector plug can include male members so that mating can be achieved when the receptacle and the connector plug are in contact. The connector receptacle chosen and positioned in the housing mates with a matching connector plug that is positioned in the device into which the battery pack is inserted. The connector assembly can be manufactured of plastic, but other materials can be envisioned and are acceptable, such as metal.

Figure 5:
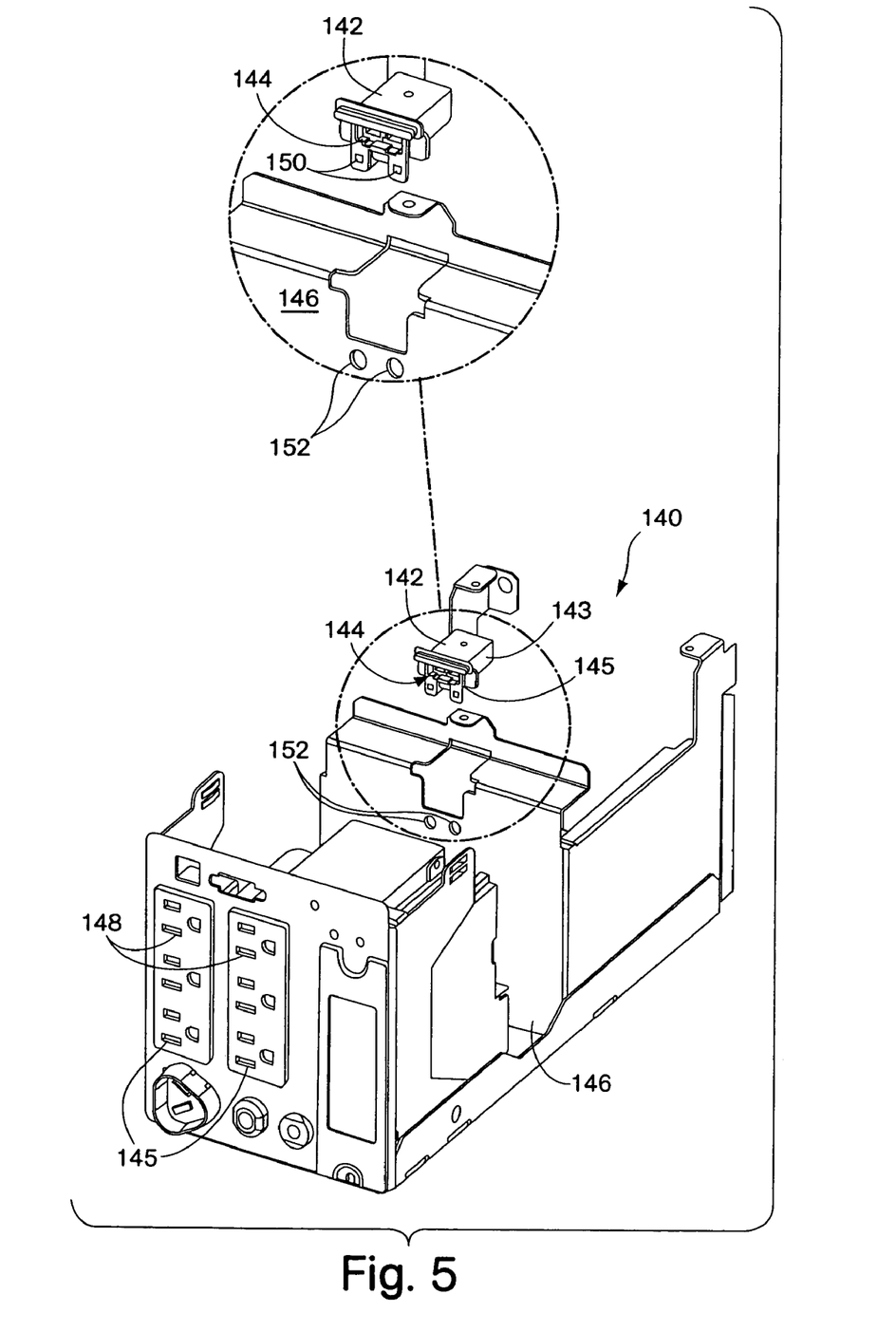
FIG. 5 is a partial assembly view of the connector plug in an electronic device in one embodiment of the present invention.

Referring to FIG. 5, a connector plug 142 that accepts the connector receptacle 118 is shown. The connector plug 142 is positioned within the uninterruptible power supply prepared to accept the insertion of the battery pack 130. The connector plug 142 is depicted prior to connection to an electronic device 140. The connector plug 142 includes a front side 143 and a back side 145. The front side 143 connects to the connector receptacle 118. On the back side 145 of the connector plug 142, the connector plug 142 includes telecommunications ports 144 for connection to other electronic media, for example. The connector plug 142 can also have power ports. The body of the connector plug also includes snaps 150. The device to which the connector plug 142 is attached includes a panel 146 having apertures 152 for accepting the snaps 150. The front face of the connector plug is positioned on the panel 146 to align with the connector receptacle when the battery pack 130 is inserted into the chassis.

The panel 146 can be constructed to provide a ledge having an opening where the connector plug 142 rests. As mentioned, to keep the connector plug in position, the panel 146 includes apertures 152 that accept snaps 150, thereby retaining the connector plug 142 in position on the panel. The snaps 150 can be the shape of two knobs extending from the body of the connector plug 142, and can be extending below the level of the mating portion of the connector plug into which the connector receptacle is inserted. The apertures 152 are sufficiently larger than the snaps 150 such that the snaps 150 are retained when placed in the openings 152, but the snaps do not fit snugly. Instead, the apertures 152 allow the snaps 150 to move, or float, within the apertures 152, thereby allowing the connector plug 142 to float. For example, the connector plug 142 is able to move both up and down, and side-to-side while retained by the snaps in the apertures. In this way, the general location of the connector plug 142 remains fixed, but the connector plug 142 is able to move to accept the connector receptacle when the battery pack is inserted into the device 140. If, for example, the connector receptacle housing 118 is inserted such that it is not directly aligned with the connector plug 142, the connector plug can move to re-position itself to accept the connector receptacle. The ability of the connector plug to align with the connector receptacle relieves the assembler of the device from having to visually examine the connecting point or manually connect the respective terminals of the battery to the device. The connector receptacle and the connector plug 142 self-align within the chassis with the help of this integral alignment feature.

Because the connector plug 142 is substantially restricted in motion, self-alignment is further accomplished by the placement of the connector housing 118 on the battery pack. As discussed herein, the ribs 117 on the bottom portion of the connector housing ensure alignment of the connector along the x-axis by slipping into a ridge formed between the individual batteries of the battery pack 130. Further, the edge stop 119 rests against the edge of the battery pack to ensure alignment in the y-axis. Thus, an assembler of the battery pack need simply slip the ribs into position and align the edge stop, and the connector receptacle is prepared for insertion and mating with the connector plug.

Figure 6:
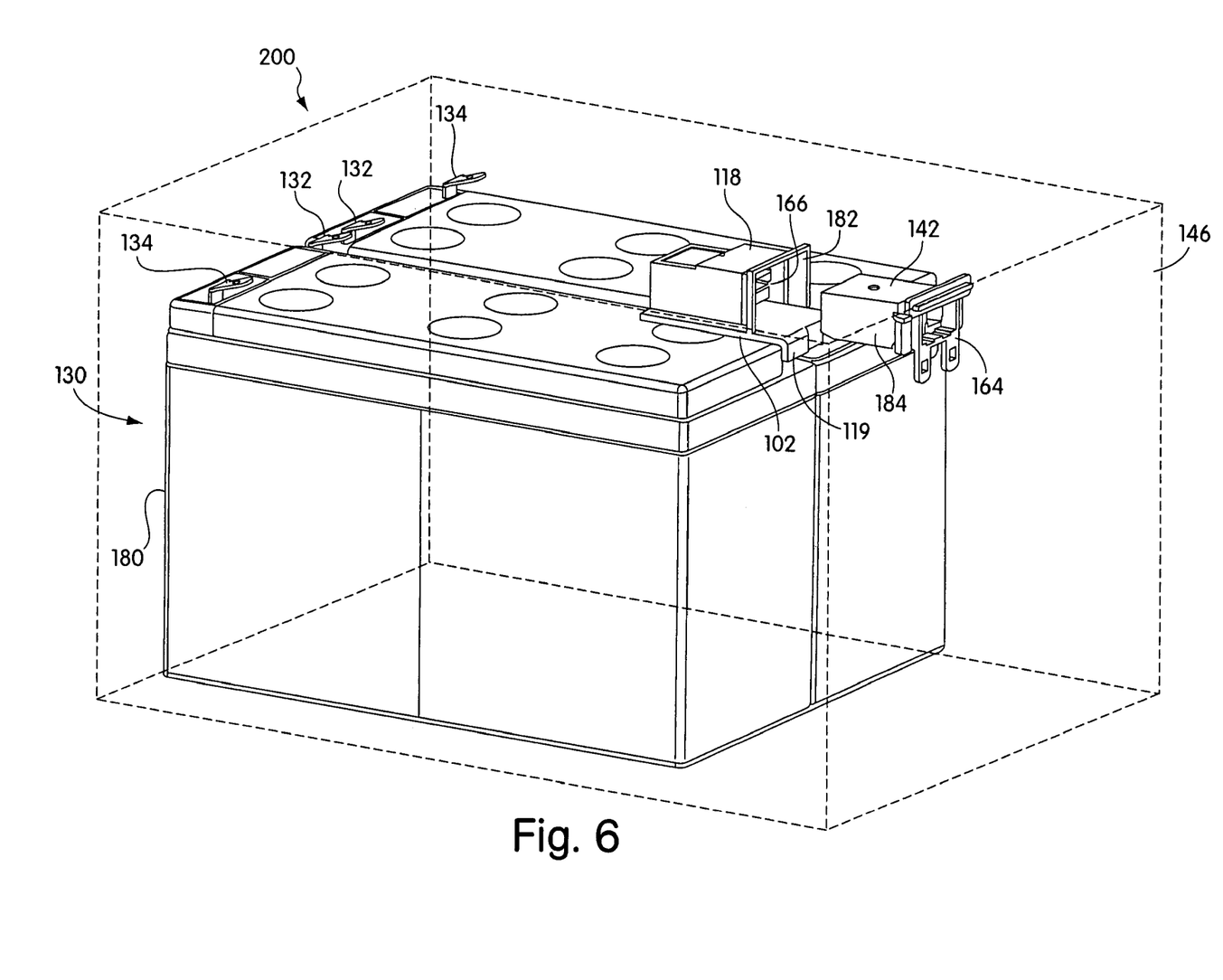
FIG. 6 is a perspective view of the battery pack inserted in the chassis before connection of the battery connector in one embodiment of the invention.

Referring to FIG. 6, a perspective view of the connector receptacle substantially immediately prior to connection with the connector plug is shown. For simplicity, and to better view the blind mate connection, portions of the blind mate connector system are removed and the device chassis is simplified. The connector receptacle housing 118 is attached to the battery pack 130 via the adhesive bond joint 102. The connector receptacle 121 is in partial view in the receptacle housing 118. The connector plug 142 including snaps 150 is coupled to the panel 146 of the device. As force is applied to the back face 180 of the battery pack 130, the blind mate connector receptacle housing 118 comes into proximity of the connector plug 142. The lead-in angles 182 of the receptacle housing 118 are positioned such that the widest portion of the receptacle housing 118 is closest in position to the connector plug 142. The receptacle housing 118 is thus slightly bell-shaped.

Likewise, the connector plug 142 is shaped to increase the ease of insertion of the receptacle into the connector plug. The sides of the connector plug 142 are slightly curved such that the smallest perimeter is in closest proximity to the receptacle housing 118. The receptacle housing 118 approaches the connector plug 142, and the lead-in angles 182 of the receptacle housing assists in guiding the connector receptacle to a mating position with connector plug. The connector plug 142 is assisted by the lead-in angles 182 of the receptacle housing 118 due to the floating ability of the connector plug, as the connector plug can float to a position where the outer side edges 184 are guided into the housing. Thus, the outer perimeter of the connector plug 142 can be slightly smaller than the inner perimeter of the receptacle housing 118.

The connection between the battery pack and the electronic device is complete when the connector plug 142 and the connector receptacle 121 are mated. The guiding shape of the system allows a user of the device to position the battery pack 130 into the device without necessitating manual connection of the battery leads to the battery terminals. Similarly, the battery pack 130 can be removed from the device by pulling or otherwise separating the receptacle and connector plug, generally without requiring visual knowledge of the connector system. Battery connection is greatly improved in efficiency and safety, as the receptacle housing 118 and the connector plug 142 self-align upon insertion of the battery pack into the device, and the multiple batteries of the battery pack are channeled to a single point of connection.

In embodiments of the invention, the battery is placed in an uninterruptible power supply system for back-up power for the UPS. As will be apparent to one skilled in the art, the battery replacement system can be used as a primary source of power in portable electronic devices, as well as other electronic devices.

In embodiments of the invention as shown in FIG. 1, an off-line UPS configuration is depicted. As is apparent to one skilled in the art, other embodiments can be used in on-line UPS configurations, or any other type of UPS configuration accepting a battery as an alternate power source.

In embodiments of the invention, an exemplary connector is depicted in FIG. 5 to illustrate a connector that can be used in the blind mate connector system. As is apparent to one skilled in the art, any of a plurality of known connectors from a variety of manufacturers can be implemented into the system depending upon the requirements of the device.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of coupling an electrical device to an internal power source comprising:
   attaching a bell-shaped connector receptacle adjacent to a first end of a battery pack an adhesive bond, and including connecting the receptacle to leads of the battery pack;
   float-mounting a connector plug onto a portion of the electronic device such that the connector plug is movably connected on the electronic device to facilitate automatic coupling with the connector receptacle;
   aligning the receptacle with the connector plug and inserting the battery pack into the electronic device by applying a force to a second end of the battery pack that is distal from the first end; and
   mating the receptacle and the connector plug in the electronic device.

2. The method of claim 1 further comprising aligning the receptacle on the battery pack using a tongue-and-groove configuration.

3. The method of claim 2 further comprising aligning the receptacle on the battery pack using an edge stop positioned to contact a front edge of the battery pack.

4. A battery connector system for use in connecting a battery to a load, comprising:
   a connector receptacle having a bell-shaped housing, the connector receptacle adhesively bonded to a battery pack configured to provide power to an electronic device;
   a connector plug positioned in the electronic device, the connector plug including an alignment surface configured to align with the bell-shaped housing of the connector receptacle; and
   mounting means for float connecting the connector plug to the electronic device such that the connector plug is movably connected on the electronic device to facilitate automatic coupling with the connector receptacle.

5. The battery connector system of claim 4, wherein the mounting means includes a snap inserted into an aperture formed in the electronic device.

6. The battery connector system of claim 5, wherein the mounting means includes a knob to insert into an aperture, and wherein the dimensions of the knob are substantially smaller than the dimensions of the aperture.

7. The battery connector system of claim 4 wherein the electronic device includes an uninterruptible power supply.

8. The battery connector system of claim 4 wherein the connector receptacle includes a wire configured to connect to leads of the battery pack.

* * * * *

UNITED STATES PATENT AND TRADEMARK OFFICE
CERTIFICATE OF CORRECTION

PATENT NO. : 7,402,062 B2
APPLICATION NO. : 11/157386
DATED : July 22, 2008
INVENTOR(S) : Lou Perry

It is certified that error appears in the above-identified patent and that said Letters Patent is hereby corrected as shown below:

In the specification:
Column 7, line 51, after the word "with" add "the";

In the claims:
Column 8, claim 1, line 35, after the word "pack" add "using".

Signed and Sealed this

Twenty-second Day of September, 2009

David J. Kappos
*Director of the United States Patent and Trademark Office*